United States Patent [19]

Grainger et al.

[11] Patent Number: 5,173,021

[45] Date of Patent: Dec. 22, 1992

[54] COMPRESSORS

[75] Inventors: John K. Grainger, Liverpool; David Flaxington, Formby, both of England

[73] Assignee: Garrett Automotive Limited, Lancashire, England

[21] Appl. No.: 729,116

[22] Filed: Jul. 12, 1991

[30] Foreign Application Priority Data

Jul. 26, 1990 [GB] United Kingdom ................. 9016399

[51] Int. Cl.⁵ ............................................... F01D 5/10
[52] U.S. Cl. .................................... 415/119; 251/61.1; 60/611; 181/252; 181/256
[58] Field of Search ................... 415/119; 60/600, 601, 60/611; 123/564; 137/454.2; 251/61.1, 61.5; 181/252, 256

[56] References Cited

U.S. PATENT DOCUMENTS

| | | | |
|---|---|---|---|
| 2,427,441 | 9/1947 | Butts | 251/61.1 X |
| 3,783,969 | 1/1974 | Pall | 415/119 X |
| 3,947,148 | 3/1976 | Holt | 415/119 |
| 4,411,592 | 10/1983 | Traver et al. | |
| 4,505,296 | 3/1985 | Field et al. | 137/454.2 X |
| 4,508,486 | 4/1985 | Tinker | 415/119 |
| 4,517,803 | 5/1985 | Jamison | |
| 4,786,231 | 11/1988 | Kelley | 415/119 |
| 4,969,536 | 11/1990 | Allen | 415/119 X |

FOREIGN PATENT DOCUMENTS 1495959 9/1967 France .

Primary Examiner—John T. Kwon
Assistant Examiner—Todd Mattingly
Attorney, Agent, or Firm—Ken C. Decker; William N. Antonis

[57] ABSTRACT

An engine-exhaust gas driven turbo compressor has a controllable diaphragm valve (13, 15) in a flow path (20, 24) between a compressor delivery port (6) and an atmospheric inlet port (4), this valve being controllable to regulate gas flow via the compressor wheel member (2) to avoid compressor surging when the demand is low and a compressed torroidal wire mesh element (23) is accomodated in an annular region (22) of the compressor housing between the valve (13, 15) and the inlet port to suppress noise resultant upon operation of the valve.

8 Claims, 2 Drawing Sheets

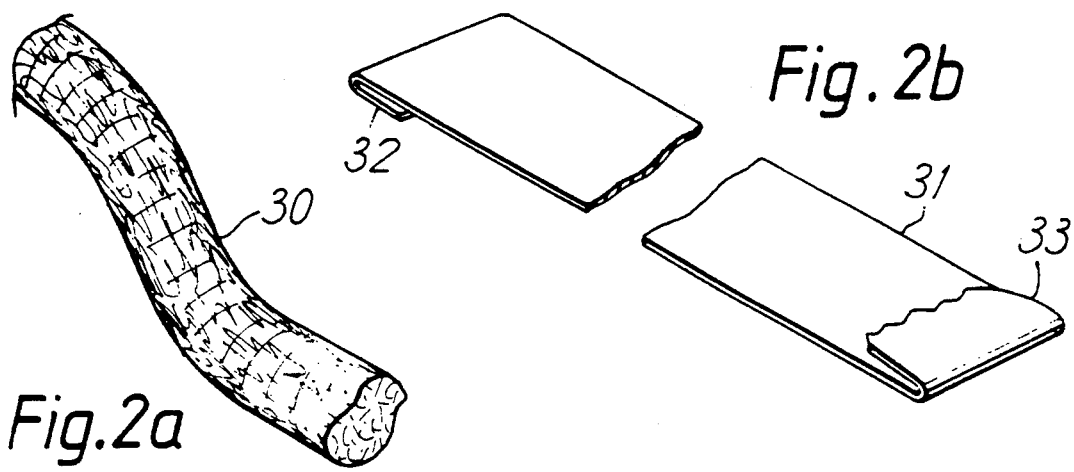
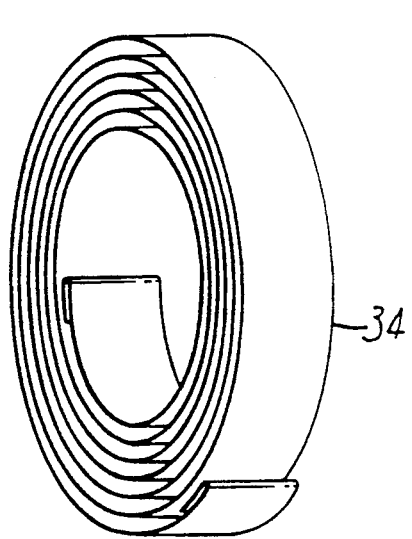
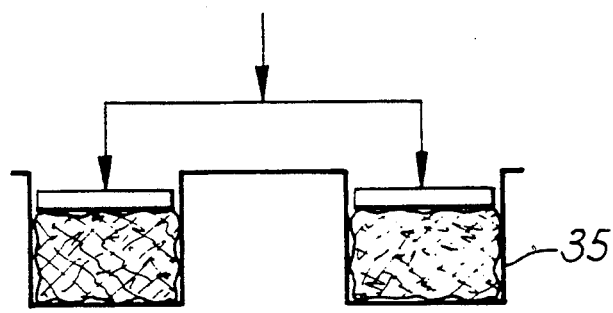
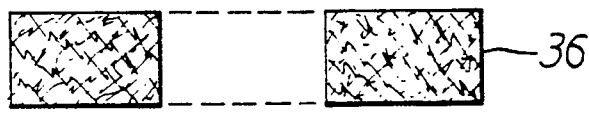

COMPRESSORS

This invention relates to rotary compressors and relates more especially but not exclusively to turbocharger compressors.

BACKGROUND OF THE INVENTION

In the specification of U.S. Pat. No. 4,517,803, a turbocharger compressor is described for delivering air under pressure to the induction system of an engine. The compressor has a housing which accommodates a controllable diaphragm valve permitting selective recirculation of air via a recirculation duct from a compressor delivery to the compressor inlet to avoid surging the compressor during engine transients when the throttle is closed.

While such a valve arrangement is inexpensive and functionally satisfactory, it can introduce undesirable noise during the transition between open and closed conditions and the object of the present invention is to improve such a compressor by reducing the discernible noise produced by the controllable valve.

SUMMARY OF THE INVENTION

According to the present invention, a compressor is provided having a housing defining an air intake port and an air delivery port. A compressor member is rotatable in the housing to induce air at the intake port for delivery at elevated pressure at the delivery port. The housing further defines a recirculation flow path between the delivery port and the intake port. A control valve in the recirculation path regulates flow rate via the compressor member. The recirculation path also includes an open cell or mesh element. The open cellular or mesh structure of the open cell or mesh element attenuates noise production resulting from the action of the control valve.

The element may preferably comprise an annular element of woven or knitted metallic stainless steel mesh, rolled and pressed into an element of predetermined dimensions.

Preferably, the valve comprises a spring-loaded diaphragm having an annular surface engageable with an annular seat defining a bounding periphery of the recirculation path. The path includes an annular region which receives the open cell or mesh element, which is of a correspondingly toroidal configuration to match the annular region.

DESCRIPTION OF THE DRAWING

In order that the invention may be more clearly understood and readily carried into effect the same will now be further described by way of example with reference to the accompanying drawings, in which:

FIG. 2a is a perspective view of the stock mesh material from which the silencer element used in the compressor of FIG. 1 is formed; and FIG. 2b-2d illustrate the steps of forming the stock mesh material of FIG. 2a into the silencer element used in the compressor of FIG. 1.

DETAILED DESCRIPTION

Figure 1:
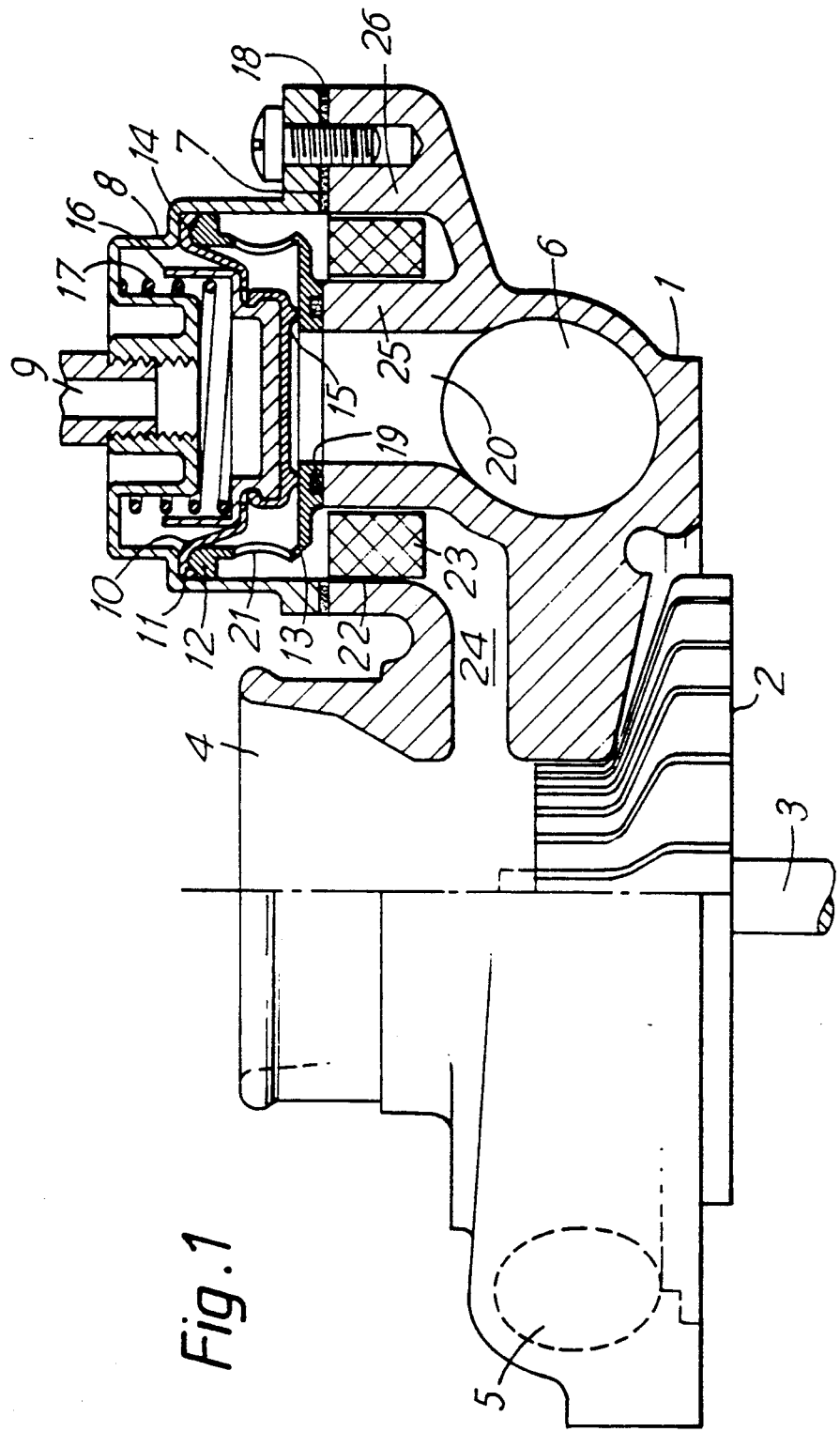
FIG. 1 illustrates in cross-sectional view of part of a turbocharger compressor employing an element as proposed in accordance with the invention.

Referring to the drawing, the turbocharger compressor includes an end housing portion 1 within which an engine-exhaust turbine-driven centrifugal compressor wheel member 2 of known form is mounted for rotation on a shaft 3 to draw air from an atmospheric inlet port 4 into a scroll-configured compressor passage 5. The scroll-configured passage 5 terminates in a delivery opening 6 leading to the fuel induction or carburation system of the engine. Adjacent the delivery opening 6, the housing portion 1 has a planar surface 7 which receives a recirculation valve housing 8 accommodating a diaphragm valve and a valve control port 9.

The diaphragm valve comprises a molded, generally cup-shaped diaphragm 10 formed of a suitable synthetic rubber with a nylon fabric reinforcement. The diaphragm 10 has a peripheral bead 11 which upon assembly is trapped between the rim 12 of an annular member 13 and an internal shoulder 14 of the housing 8. The central portion 13 of the diaphragm defines an annular valve element 15 and is molded to provide a snap-fit over a central portion of a movable cup-shaped member 16. The member 16 is spring loaded by a captive spring 17 to urge the valve element 15 against the inner surface of member 13. The housing 8 is provided with a gasket 18 and the member 13 is provided with an o-ring seal 19, which seals against the outer end of an internal annular portion 25 defining a flow passage 20. The annular portion 25 and the outer wall 26 of the housing define between them an annular region 22 connecting with the interior of member 13 via openings 21. The recirculation valve thereby provides a path for air from delivery port 6 via the passage 20, the diaphragm valve when unseated, side openings 21 of member 13, the annular region 22 and then via a passage 24 to the inlet port 4. The mentioned annular region 22 houses a push fitted toroidal open-cell element 23 via which all air flow between passages 20, 21 is constrained to flow.

The push fitted toroidal open-cell element 23 is preferably formed of a tubular knitted sock-like stainless steel fabric element rolled about itself to form the toroidal open cell form, half of the volume of which is free air. Preferably, the element is so folded that any wire ends are internally contained.

The toroidal open-cell element 23 is preferably formed of a mesh of 18/8 stainless steel wire, typically of 0.25 mm gauge. The wire is woven to produce a tubular stocking-like form as illustrated at 30 in FIG. 2a. Thereafter, a length predetermined to produce the desired density and toroidal dimensions, is cut and flattened to form a band as at 31 in FIG. 2b. The ends 32 and 33 of this band are folded over to eventually contain all raw wire ends and the band 31 is rolled into a coil 34 as illustrated in FIG. 2c. This coil is such as to be loosely acceptable in a mold 35 as in FIG. 2d wherein it is pressed by an annular platen to take up the precise desired external dimensions of the final element 36 of FIG. 2e. Being formed of a stocking-like element with the raw ends turned inwards, no external single thickness or raw wire ends are exposed on the compressed toroid.

The element 23 may alternatively comprise knitted or woven synthetic fibers. Open cell plastic foam may also be employed or an air-laid open-cell fibrous felt-like batt may be formed to the desired shape. The principle desirable attributes for the form of the element 23 are that it shall withstand the known high operating temperatures attained by a turbocharger compressor, that it shall have sufficiently close open-cell or mesh structure to achieve the desired noise attenuation and that it shall not be liable to shed strands or particles into the engine induction system throughout the entire useful life of the compressor.

Typically, the element has 50% free volume, that is, half its volume comprises the wire or other material and the other half comprises free air.

MODE OF OPERATION

In operation, the compressor member 2 causes air to be drawn from intake port 4 via the scroll-configured passage 5 to the delivery port 6. If the flow rate is low, the compressor "surges" and the flow becomes unstable with flow reversals alternating with the flow into the compressor. Such a condition can occur if a throttle downstream of the compressor is closed suddenly as, for instance, occurs during a gear change on a turbocharged gasoline engine. In such a case, a depression exists downstream of the throttle with a high pressure in the compressor delivery port 6. This depression is communicated to port 9 and the diaphragm is lifted by the pressure differential acting on the annular valve 15 and overcoming the pre-load provided by spring 17. Some of the air is thereby recirculated to the intake port 4 via passages 20, 21, 23 and 24 and the annular open-cell element 23. This action allows the compressor to deliver a high enough flow rate to avoid "surge" if the flow passages 20, 21, 23 and 24 are adequately dimensioned and if the element 23 is not too restrictive.

We claim:

1. A compressor having a housing defining an air intake port and an air delivery port, a compressor member rotatable in said housing to induce air at said intake port for delivery at elevated pressure at said delivery port, said housing further defining a recirculation flow path between said delivery port and said intake port, a control valve in said recirculation path for regulating flow rate via the compressor member, said recirculation path also including an open cell or mesh element, the open cellular or mesh structure of the element being such as to attenuate noise production resulting from the action of said control valve.

2. A compressor as claimed in claim 1, said compressor housing having an internal annular portion defining a flow passage between said delivery port and said control valve and said annular portion also defining an inner wall of an annular region in the part of said flow path between said control valve and said intake port, said open cell or mesh element being a torroidal element fitting in said region.

3. A compressor as claimed in claim 2, said control valve comprising a valve housing, an inner member and a cup-shaped diaphragm the periphery of which diaphragm is clamped via said inner member between the valve housing and the compressor housing.

4. A compressor as claimed in claim 3, said inner member defining a valve seat against which the diaphragm is engageable and said inner member being sealingly engaged with an outer end of said annular potion.

5. A compressor as claimed in claim 1, said element being of a coiled length of woven mesh to provide a generally annular shape.

6. A compressor as claimed in claim 5, characterized in that said element is a predetermined length of tubular woven mesh, said mesh being flattened into a ribbon, the raw ends of said ribbon being folded inwards, said ribbon being rolled into a coil to form a generally annular shape.

7. A compressor as claimed in claim 6, wherein said annular shape is a compressed toroid of predetermined dimensions to fit said annular region.

8. A compressor as claimed in claim 2, wherein an element is a predetermined length of tubular woven mesh, said mesh being flattened into a ribbon, the raw ends of said ribbon being folded inwards, said ribbon being rolled into a coil to form a generally annular shape compressed into a toroid of predetermined dimensions to fit said annular region.

* * * * *